United States Patent [19]
Dodds et al.

[11] Patent Number: 5,891,815
[45] Date of Patent: Apr. 6, 1999

[54] SILICA, BORON NITRIDE, ALUMINUM NITRIDE, ALUMINA COMPOSITE, ARTICLE AND METHOD OF MAKING SAME

[75] Inventors: Gerald C. Dodds, Oaks; Richard A. Tanzilli, Malvern, both of Pa.

[73] Assignee: Lockheed Martin Corporation, Sunnyvale, Calif.

[21] Appl. No.: 287,233

[22] Filed: Dec. 21, 1988

[51] Int. Cl.[6] .............................. C04B 35/58; C04B 35/18
[52] U.S. Cl. .......................... 501/96.1; 501/98.1; 252/518
[58] Field of Search .......................... 501/96, 98; 252/518

[56] References Cited

U.S. PATENT DOCUMENTS

| | | | |
|---|---|---|---|
| 3,991,148 | 11/1976 | Lumby et al. | 501/98 |
| 4,113,503 | 9/1978 | Lumby et al. | 501/98 |
| 4,127,416 | 11/1978 | Lumby et al. | 501/98 |
| 4,304,870 | 12/1981 | Rice et al. | 501/98 |
| 4,310,499 | 1/1982 | Mitomo et al. | 423/327 |
| 4,377,542 | 3/1983 | Mangels et al. | 264/65 |
| 4,438,051 | 3/1984 | Mitomo et al. | 501/98 |
| 4,539,300 | 9/1985 | Coblenz | 501/98 |
| 4,552,711 | 11/1985 | Raj et al. | 264/65 |
| 4,666,873 | 5/1987 | Morris, Jr. et al. | 501/96 |
| 4,711,644 | 12/1987 | Yeckley et al. | 51/307 |
| 4,720,362 | 1/1988 | Gentilman et al. | 264/1.2 |

FOREIGN PATENT DOCUMENTS 0021864  7/1983  Japan .............................. C04B 35/58

*Primary Examiner*—William R. Dixon, Jr.
*Assistant Examiner*—C. Melissa Bonner
*Attorney, Agent, or Firm*—W. H. Meise; L. B. Wegemer; S. A. Young

[57] ABSTRACT

Multiphase ceramic composites containing 47% to 52% by weight aluminum nitride, 23% to 27% by weight silica, 3% to 7% alumina and the balance boron nitride wherein the boron nitride is one phase in the composition and the reaction products of aluminum nitride, silica and alumina are the other phase in the composite. The boron nitride phase is uniformly distributed in the form of discrete particles throughout the reaction products of aluminum nitride, silica and alumina. A window transparent to electromagnetic radiation in a predetermined frequency spectrum is made by forming a homogeneous, finely-divided mixture of the foregoing composite and compacting the homogeneous, finely-divided mixture at an elevated temperature and pressure for a sufficient time to form reaction products of the aluminum nitride, silica and alumina. In preferred embodiments, the homogeneous, finely-divided mixture of aluminum nitride, silica, boron nitride and alumina is densified at a temperature of 1760° C. and at a pressure of about 3775 p.s.i. for about 1 hour.

16 Claims, 2 Drawing Sheets

५,८९१,८१५

SILICA, BORON NITRIDE, ALUMINUM NITRIDE, ALUMINA COMPOSITE, ARTICLE AND METHOD OF MAKING SAME

This invention was made with government support under contract number DNA 001-84-C-0390 awarded by Defense Nuclear Agency. The government has certain rights in this invention.

BACKGROUND OF THE INVENTION

The present invention relates to silicon aluminum oxynitride-boron nitride composites and articles and to a method of making the composites and articles, and more particularly, to a multiphase ceramic composite of silicon aluminum oxynitride and boron nitride, a window transparent to electromagnetic radiation made therefrom and to a method for making the same.

High-speed vehicles, such as high-speed aircraft, may be required to pass through a hostile environment. Under these conditions, it may become necessary to provide protection for certain communication and detection apparatus carried by such a vehicle from sources of heat shock and pressure shock. In such high-speed vehicles, such shock is typically due to frictional contact with the ambient environment. Protection from heat and pressure shock must be provided without detracting from the ability of the protected apparatus to communicate with the outside of the vehicle by means of electromagnetic radiation within the frequency spectrum of interest. A common way of providing the desired protection is to place the apparatus behind a suitable window, which is transparent to the desired frequency spectrum of electromagnetic radiation, sometimes referred to as an electromagnetic window or an antenna window.

Currently available compositions for providing such an electromagnetic window or antenna window often lack the requisite mechanical strength, toughness and thermal shock resistance. In U.S. Pat. No. 4,666,873, Morris, Jr. and Tanzilli have provided an improved window transparent to electromagnetic radiation in a predetermined frequency spectrum wherein the window is made from a ceramic material containing about 0.01 percent to about 35 percent by volume boron nitride and aluminum nitride. In U.S. Pat. No. 4,666,873, which is incorporated herein by reference in its entirety, an article is fabricated by mixing powders of the specified materials; shaping the mixture into the desired form of the article; and densifying the mixture in a non-oxidizing medium at a temperature, pressure and time sufficient to form a structural ceramic. Morris, Jr., and Tanzilli found that the resulting ceramic article could be used to protect apparatus from damage due to heat or pressure shock without detracting from the ability of the apparatus to communicate through the ceramic article (window) by means of electromagnetic radiation in a predetermined frequency spectrum.

Although U.S. Pat. No. 4,666,873 provides a ceramic article, such as an electromagnetic window, having excellent characteristics, it is always desirable to provide alternative composites and articles made therefrom wherein one or more of the properties are improved. A composite for use as an electromagnetic window ideally possesses transparency to electromagnetic radiation in a predetermined frequency spectrum over a wide temperature range, congruent vaporization kinetics, appropriate dielectric properties, thermal shock resistance over a wide range of heating rates, mechanical strength and toughness, spall resistance, high refractoriness, and a low erosion rate and ablation rate.

OBJECTS OF THE INVENTION

Accordingly, it is the primary object of the present invention to provide new composites in which one or more of the prior art properties discussed above are improved.

It is another object of the present invention to provide new and improved composites which can be shaped into an article, such as an electromagnetic window or an antenna window, which exhibits improved high temperature radar transmission.

It is still another object of the present invention to provide a composite ceramic material which can be fabricated into an electromagnetic window or antenna window, having improved toughness.

Another object of the present invention is to provide a new and improved ceramic composite which can be fabricated into an electromagnetic window or antenna window, having lower thermal expansion and lower thermal conductivity.

Still another object of the present invention is to provide a method of fabricating a window transparent to electromagnetic radiation in a predetermined frequency spectrum from aluminum nitride, alumina, silica and boron nitride.

SUMMARY OF THE INVENTION

These and other objects are achieved by providing a multiphase ceramic composite having a boron nitride phase and three silicon aluminum oxynitride phases, the silicon aluminum oxynitride phases being the reaction products of aluminum nitride, silica and alumina, wherein the boron nitride phase is uniformly distributed in the form of discrete particles throughout the silicon aluminum oxynitride phases. In certain embodiments the present invention provides a multiphase ceramic composition containing about 47% to about 52% by weight aluminum nitride, about 23% to about 27% by weight silica, about 3% to about 7% by weight alumina and the balance boron nitride, the boron nitride being one phase in the composite and the reaction products of aluminum nitride, silica and alumina forming a multiphase matrix in the composite, wherein the boron nitride phase is uniformly distributed in the form of discrete particles throughout the reaction products of aluminum nitride, silica and alumina. It has been found that the multiphase ceramic composite of silica, boron nitride, aluminum nitride and alumina results in a composite combining moderate thermal expansion, low thermal conductivity, improved high temperature radar transmission and improved toughness to make an excellent antenna window material.

In accordance with the objects of the present invention, there is also provided a method for the fabrication of a multiphase silica aluminum oxynitride and boron nitride composite ceramic material by forming a homogeneous finely-divided mixture of about 47% to about 52% by weight aluminum nitride, about 23% to about 27% by weight silica, about 3% to about 7% by weight alumina and the balance boron nitride; and compacting the homogeneous, finely-divided mixture in an inert atmosphere at an elevated temperature and pressure for a sufficient time to form three silicon aluminum oxynitride phases from the aluminum nitride, silica and alumina and having the boron nitride uniformly distributed in the form of discrete particles throughout the three silicon aluminum oxynitride phases, whereby the boron nitride is one phase and the reaction products of aluminum nitride, silica and alumina (silicon aluminum oxynitride) are the matrix phase of the composite. The articles or windows are fabricated by mixing the specified amount of silica, boron nitride, aluminum nitride and alumina; shaping the mixture into substantially the desired form of the article or window; and densifying the mixture, preferably in a non-oxidizing medium, at a temperature, pressure and time sufficient to form a structural ceramic material or window.

The resulting ceramic composite, article or window, for example, an electromagnetic window or antenna window, may be used to protect apparatus from damage due to heat or pressure shock without detracting from the ability of such apparatus to communicate through the article or window by means of electromagnetic radiation in a predetermined frequency spectrum. For example, where the apparatus is located within a vehicle, the window is shaped to conform to the window opening of the vehicle and to the vehicle contours in the vicinity of such opening and is used to protect the apparatus against harm.

The foregoing and various other objects of the invention will become clear from the following detailed description taken in conjunction with the accompanying drawings.

DETAILED DESCRIPTION OF THE INVENTION

Figure 1:
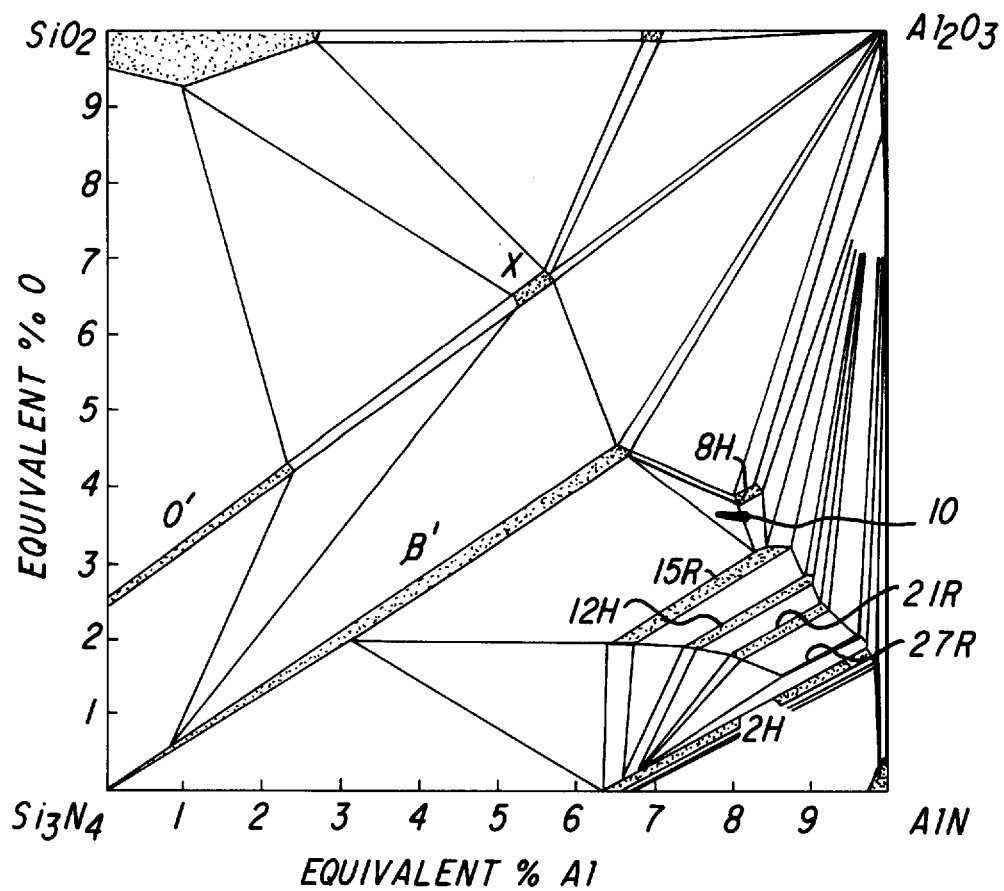
FIG. 1 is an isothermal cross-section of the $Si_3N_4$—AlN—$SiO_2$—$Al_2O_3$ quaternary phase diagram at 1760° C. showing the multiphase silicon aluminum oxynitride matrix of the present invention.

Aluminum nitride possesses several characteristics which make it suitable as a structural ceramic article in applications requiring radar transparency and strength, such as, the use as an electromagnetic window on high-speed aircraft. Although aluminum nitride may be suitable in some aspects, it does not possess a complete combination of characteristics which make it desirable for the above applications. In accordance with the present invention, it has been found that if particles of boron nitride are dispersed in a matrix of the reaction products of aluminum nitride, silica and alumina in specified quantities to form a composite, the composite has certain new and unexpected desirable characteristics, while preserving the desirable characteristics, such as the radar transparency and congruent vaporization kinetics already present in the pure aluminum nitride.

In preferred embodiments of the present invention, about 47% to about 52% by weight aluminum nitride powder, about 23% to about 27% by weight silica powder, about 3% to about 7% by weight alumina powder and the balance boron nitride powder, are mixed, formed and densified to produce a multiphase particulate ceramic composite or a window transparent to electromagnetic radiation in a predetermined frequency spectrum. The mixing, forming and densifying steps may be performed in accordance with conventional techniques known to the art so as to produce a structural ceramic or a window of appropriate quality. In most embodiments of the present invention, the balance of the mixture, that is, the boron nitride, is present at about 23% to about 27% by weight of the composite. In the most preferred embodiments of the present invention, the ceramic composition comprises about 47% by weight aluminum nitride, about 24% by weight silica, about 24% by weight boron nitride and about 5% by weight alumina.

The aluminum nitride, silica, boron nitride and alumina should be free of impurities which interact with the components in a manner which compromises the integrity of the ceramic, or which compromises any of the desired characteristics or properties of the composite. In accordance with the present invention, it is desirable, though not essential, that the powders or source of the powders be purified so that they are at least about 95% by weight pure. Preferably, the powders of boron nitride, aluminum nitride, silica and alumina have a purity, such as, for example, about 98% by weight pure. Whenever possible and within practical limits, the powders used in the compositions of the present invention are about 99.9% by weight pure. The use of high purity powders improves some of the characteristics of the composite which make the composite suitable for use as an electromagnetic window. For example, high purity powders usually improve radar transparency. In most cases, impurities diminish the excellent radar transparency normally exhibited by the silica-boron nitride-aluminum nitride-alumina composite.

Aluminum nitride, present in the ceramic composition at about 47% to about 52% by weight of the total composition, is the major constituent in the composition. The importance of the aluminum nitride in the composition is explained in detail in U.S. Pat. No. 4,666,873 where it is also indicated that in order to aid congruent vaporization kinetics during the varporization of the composite, a small quantity of an oxygen-containing compound may optionally be added at certain boron nitride percentages in the composite. These oxygen-containing compounds may prevent the undesirable effects of non-congruent vaporization kinetics by preventing the deposition of boron as a metal on the surface of the electromagnetic window. Contrary to the findings set forth in U.S. Pat. No. 4,666,873, where it is indicated that silica (silicon dioxide) can be introduced into the composite therein as well as alumina or boric oxide, as oxidizing agents in amounts up to 5% by volume, it has now been found that silica can be advantageously incorporated in the composite of the present invention at about 23% to about 27% by weight of the total composite, and furthermore, in addition to the silica, about 3% to about 7% alumina can be added to the composite of the present invention without adverse effect on the properties. In fact, about 23% to about 27% by weight silica and about 3% to about 7% alumina must be used in conjunction with about 47% to about 52% by weight aluminum nitride in the composite of the present invention to form reaction products in the multiphase composites of the present invention.

The aluminum nitride, silica and alumina in the composite of the present invention, form reaction products, when heated. The reaction products are substantially β'-Sialon, 8 H aluminum nitride polytype and 15 R aluminum nitride polytype. The β'-Sialon is $Si_2Al_4O_4N_4$.

During the densification of the mixture of the present invention at an elevated temperature and at an elevated pressure, namely, for example, during the hot pressing sequence, the aluminum nitride reacts with the silica and alumina to form a matrix phase of β'-Sialon, the 8 H polytype of aluminum nitride and the 15 R polytype of aluminum nitride as revealed by powder X-ray diffraction (XRD) analysis. The matrix phase 10 of this composite falls in the three phase region of the $Si_3N_4$—AlN—$SiO_2$—$Al_2O_3$ quaternary phase diagram as shown in FIG. 1 which represents the isothermal cross-section of the $Si_3N_4$—AlN—$SiO_2$—$Al_2O_3$ phase diagram at 1760° C. The X-ray diffraction analysis also shows that boron nitride does not react significantly with the other constituents in the composite and remains as a discrete, separate phase throughout the process. Thus, in accordance with the present invention, the boron nitride is uniformly distributed in the form of discrete particles throughout the reaction products of aluminum nitride, silica and alumina. For a complete discussion of the quaternary phase diagram, reference characters and elements therein, reference is hereby made to U.S. Pat. No. 4,113,503 which is incorporated herein by reference in its entirety.

The ingredients of the present invention, namely, the aluminum nitride, silica, boron nitride and alumina can be obtained from any conventional source as discussed above and can be further refined and purified as desired. The powders are generally commercially available in various degrees of purity and size. Although there is no limitation as to the size of the particles in the aluminum nitride powder, silica powder or alumina powder, generally, the maximum particle size which should be used within the scope of the present invention is that which permits the densification of the composite and which permits the chemical combination of the aluminum nitride, silica and alumina at elevated temperature and pressure over a period of time to form the reaction products defined by the three phase region in the quaternary phase diagram of FIG. 1. In accordance with the present invention, the maximum particle size generally recommended is about 74 microns for the aluminum nitride, silica and alumina, and more preferably, the maximum particle size for aluminum nitride, silica and alumina is about 44 microns.

The maximum particle size of the boron nitride is more critical, and, in accordance with the present invention, the maximum particle size is about 10 microns or about 0.5 micron to about 10 microns. In most preferred embodiments, the boron nitride particle size is about 1 to about 5 microns. The particle size of the boron nitride is more critical than the other constituents of the composition of the present invention in view of the fact that the boron nitride remains as a separate phase and is uniformly distributed in the form of discrete particles throughout the reaction products of the aluminum nitride, silica and alumina.

In general, the particle size of the constituents used in the composition of the present invention are as small as practical manufacturing limits permit. The tendency of the particles to agglomerate generally limits the particle size ranges which can be obtained by conventional milling techniques. However, the present invention is intended to encompass particle sizes down to the molecular level.

In certain embodiments of the present invention, the silicon aluminum oxynitride and boron nitride composite ceramic material is fabricated by forming a homogeneous finely-divided mixture of the aluminum nitride, silica, boron nitride and alumina from finely-divided powders thereof. In certain preferred embodiments of the present invention, the source of the alumina is from the use of alumina grinding media used in a ball mill to grind and/or homogenize the aluminum nitride, silica and boron nitride powders. The grinding of the aluminum nitride, silica and boron nitride powders is carried out for a sufficient amount of time to provide the necessary amount of finely-divided alumina powder at a concentration of about 3% to about 7% by weight of the total composition therein. Thus, instead of mixing powders of aluminum nitride, silica, boron nitride and alumina, powders of aluminum nitride, silica and boron nitride are mixed in the presence of alumina grinding media which disperses the necessary amount of alumina powder, namely, from about 3% to about 7% by weight of the total composition, in the powders of aluminum nitride, silica and boron nitride. By this technique, the homogeneous, finely-divided mixture is formed by grinding aluminum nitride, silica and boron nitride powders in a ball mill using alumina grinding media for a sufficient time to form the homogeneous, finely-divided mixture of aluminum nitride, silica, boron nitride and alumina powders, the alumina powder being, generated in the mixture by attrition of the alumina grinding media.

The primary purpose of the mixing step in the process is to form a finely-divided, homogeneous mixture of the boron nitride, silica, alumina and aluminum nitride powders and thereby form a composite. In certain preferred embodiments, the particle size of the powders is also reduced during the mixing step by milling. The mixing and milling may be performed in any suitable device, for example, a milling device, such as, a conventional ball mill. As used herein, the term "mixing" defines any operation including milling or any combination of mixing and milling which forms a finely-divided homogeneous mixture of the boron nitride, silica, alumina and aluminum nitride powders and provides a mixture having the particle sizes designated above. This mixture can first be formed, if necessary, into a green ceramic body and subsequently densified into a ceramic component.

A simultaneous mixing and milling of the powders is preferred due to the reduction in particle size and the degree of agglomeration obtained thereby. Such reduction in particle size and degree of agglomeration results in a ceramic having superior characteristics, for example in the area of mechanical strength and toughness, due to a higher degree of dispersion of the boron nitride in the aluminum nitride, silica and alumina. A preferred mixing method comprises milling boron nitride powder, for example of about 0.5 to about 10 microns, with aluminum nitride powder and silica powders less than 44 microns in diameter for 24 hours in the presence of a milling media such as, an $Al_2O_3$ media. In order to further reduce particle size and bring about more complete mixing, a liquid medium may additionally be used during the milling process, e.g. any of several inert, non-reactive liquid organic media known in the art. By way of example and without limitation, a suitable liquid medium is reagent-grade acetone. In a preferred embodiment, the mixing step embraces wet milling of the aluminum nitride, silica and boron nitride powders in the presence of reagent-grade acetone as a liquid medium, with an alumina grinding medium. Thus, the aluminum nitride, silica and boron nitride powders are ground in the ball mill using alumina grinding media and an inert liquid organic medium, for example, reagent-grade acetone, for a sufficient time to form a wet, homogeneous mixture of aluminum nitride, silica, boron nitride and alumina powders. The wet, homogeneous mixture can then be dried, as discussed in more detail below, and converted to a finely-divided powder mixture for compacting or densification.

Densification or compacting of the ceramic composite to produce a ceramic article may be accomplished by any method known in the art, for example, by hot pressing, hot isostatic pressing, pressureless sintering and the like, or selected combinations of the preceding techniques. These methods utilize variations in temperature, pressure and time to bind and consolidate the discrete ceramic powders into a densified ceramic component. The time, temperature and pressure used to form a structural ceramic in accordance with the present invention is not critical, and one skilled in the art can provide appropriate conditions for densifying the mixture to form a structural ceramic. It is only necessary that the step of densifying the mixture be carried out at a temperature, pressure and time sufficient to form the reaction products of aluminum nitride, silica and alumina as described above and thereby form a structural ceramic.

In preferred embodiments of the present invention, the homogeneous, finely-divided powder mixture is compacted or densified at a temperature of at least about 1760° C. and a pressure of at least about 3775 p.s.i. for about 1 hour in a protective environment.

In some methods of densification, for example, hot isostatic pressing and pressureless sintering, the formation of a green ceramic body is required before densification. The process of forming a green body involves shaping the ceramic article to its approximate final shape. Methods of forming a green ceramic body are well known to those experienced in the art and include, but are not restricted to, die pressing, isostatic pressing and slip casting. Thus, according to the present method, the formation of a green body may be a necessary or a preferred step prior to densification.

It is to be understood that, at all stages of processing, the powders must be protected by a non-oxidizing atmosphere due to the susceptibility of some of these powders to oxidation. Inert environments which are suitable for use as non-oxidizing atmosphere, are, for example, a vacuum, nitrogen, a noble gas, or the like. For example, in preferred embodiments, the wet, homogeneous mixture is dried with nitrogen gas and thereafter converted to a finely-divided mixture by passing the dried mixture through a sieve.

A typical electromagnetic window which is interposed between a source of heat and pressure shock and an apparatus which communicates through electromagnetic radiation, is shown in FIG. 2B of U.S. Pat. No. 4,666,873 which is incorporated herein by reference in its entirety. The ceramic article having the composite of the present invention and prepared by the method of the present invention can be used as the window shown therein.

The following example further illustrates the practice of the present invention. The example is meant to be exemplary only and is not to be construed as limiting the invention in any way.

A precursor powder mixture of 47% by weight aluminum nitride, 24% by weight silica and 24% by weight boron nitride was ground and homogenized by wet ball milling under reagent grade acetone for 24 hours using high purity alumina ($Al_2O_3$) grinding media. During the milling step, about 5% by weight of the total composition of alumina was picked up by the precursor powder mixture due to self-attrition of the alumina grinding media. The powder was dried in a nitrogen-filled dry box to minimize contact with the atmosphere due to the hygroscopic nature of aluminum nitride, passed through a −325 mesh sieve, and hot pressed at 1760° C. and 3775 p.s.i. for 1 hour under flowing nitrogen gas in a boron nitride-lined graphite die.

The reaction product has been discussed above relative to the quaternary phase diagram shown in FIG. 1. As discussed above, the X-ray diffraction analysis reveals the particular reaction products and the dispersion of the boron nitride as a discrete, separate phase throughout the reaction products of the silica, alumina and aluminum nitride.

The physical properties of the ceramic composite material, identified herein as SIBALON (i.e. atomic elements in the composite of the present invention), are listed in the following table:

TABLE

Physical Properties of SIBALON Ceramic Composite Material

| | |
|---|---|
| Density: | 2.80–2.85 gm/cc |
| Modulus of Rupture: | 31,800–45,860 p.s.i. |
| Modulus of Elasticity: | $13.8 \times 10^6$–$18.5 \times 10^6$ p.s.i. |
| Thermal Expansion Coefficient, 20–1020° C.: | $4.08 \times 10^{-6}$–$4.19 \times 10^{-6}$/°C. |
| Thermal Conductivity, 100° C.: | 0.0659–0.0761 W/cm-°K. |
| 1200° C.: | 0.0410–0.0481 W/cm-°K. |
| Specific Heat, 100° C.: | 0.213 cal/gm-°K. |
| 1200° C.: | 0.324 cal/gm-°K. |
| Dielectric Constant, 35 GHz, 25° C.: | 7.14–7.68 |
| 1000° C.: | 8.25–9.52 |
| 8.5 GHz 25° C.: | 7.47 |
| 8.5 GHz, 700° C.: | 8.47 |
| Loss Tangent, 36 GHz, 25° C.: | 0.0150–0.173 |
| 1000° C.: | 0.0160 |
| 8.5 GHz, 25° C.: | 0.0078 |
| 8.5 GHz, 700° C.: | 0.0062 |
| Hot Radar Transmission, 35 GHz, 2500° C.: | 68% |

The combination of the properties in the TABLE lead to several performance improvements compared to the composite article described in U.S. Pat. No. 4,666,873. For example, an improved thermal insulation figure-of-merit for SIBALON is achieved primarily as the result of a reduced thermal conductivity which is approximately ¼ that of the composite article described in U.S. Pat. No. 4,666,873. Also, a significantly improved thermal shock resistance figure-of-merit for SIBALON has been observed when exposed to convective heating rates of about 1200 W/cm² for about 5 seconds. The composite article of U.S. Pat. No. 4,666,873 has been found to exhibit thermostructural failure under these identical heating rates. It is believed that this improvement is primarily the result of the significant lower coefficient of thermal expansion of SIBALON which is approximately 50 percent lower than the composite article of U.S. Pat. No. 4,666,873. In addition, significant improvements have been observed in the ability of SIBALON to transmit RF energy at 35 GHz compared to the composite article in U.S. Pat. No. 4,666,873 as the result of its lower RF loss characteristics at surface vaporization temperatures. For example, it has been found that at a temperature of about 2500° C. for a thickness of 0.025 inches, SIBALON transmits about 6 times the RF energy as the composite article in U.S. Pat. No. 4,666,873.

Figure 2:
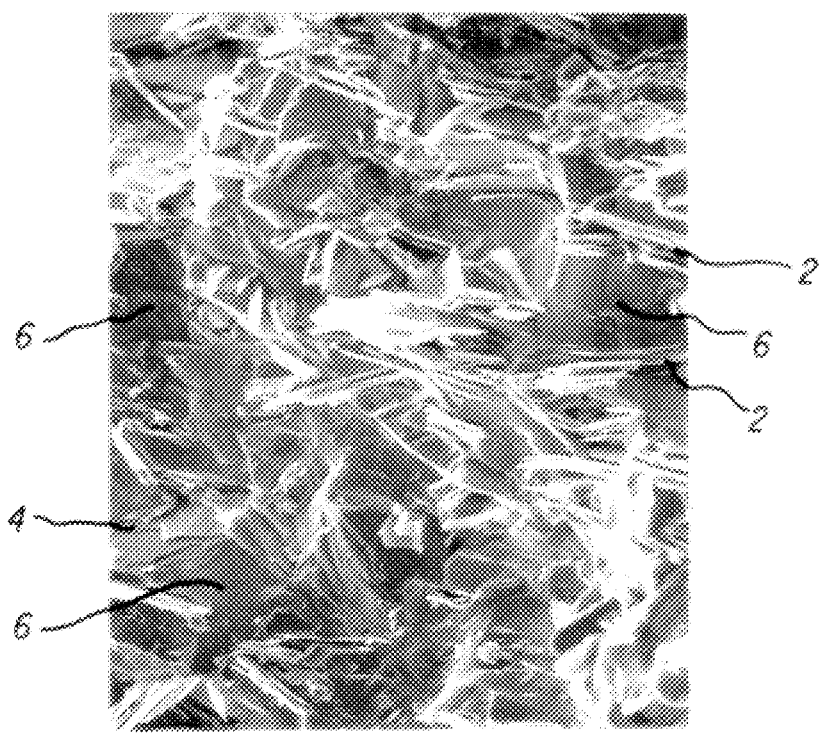
FIG. 2 is a photomicrograph at a magnification of 1500x showing the multiphase silicon aluminum oxynitride matrix (consisting of β'-Sialon, 8 H aluminum nitride polytype and 15 R aluminum nitride polytype) and the dispersed boron nitride phase composite material of the present invention.

The accompanying scanning electron microscopy micrograph of a fracture surface of the foregoing composite of the present invention and identified as FIG. 2, shows end-on views 2 of the boron nitride platelets and face or front views 4 of the boron nitride platelets. Boron nitride particles are generally in the shape of thin hexagonal platelets as shown in FIG. 2. In the photomicrograph of FIG. 2, the whiter areas and lines are end-on views of boron nitride platelets and gray areas 6 are the reaction products of alumina, silica and aluminum nitride, namely β'-Sialon, 8 H aluminum nitride polytypes and 15 R aluminum nitride polytypes.

The combination of moderate thermal expansion, low thermal conductivity and low loss tangent from room temperature to 1000° C. make the ceramic composite material of the present invention an excellent antenna window material. Furthermore, the boron nitride particulate phase wherein the boron nitride is uniformly dispersed throughout the phase resulting from the reaction products of aluminum nitride, silica and alumina, provides a toughening mechanism which also makes the ceramic composite material of the present invention an excellent antenna window material.

While numerous modifications, changes, substitutions, variations and equivalents of the present invention will now occur to those skilled in the art, it is intended that the invention be limited only by the spirit and scope of the appended claims.

What is claimed is:

1. A multiphase ceramic composite comprising, a boron nitride phase and a silicon aluminum oxynitride matrix phase, the silicon aluminum oxynitride phase being the reaction products of about 47% to about 52% by weight aluminum nitride, about 23% to about 27% by weight silica and about 3% to about 7% by weight alumina and the balance boron nitride, wherein the boron nitride phase is uniformly distributed in the form of discrete particles throughout the silicon aluminum oxynitride matrix phase formed from the aluminum nitride, silica and alumina, the boron nitride particles having a maximum particle size of about 10 microns.

2. The multiphase ceramic composite of claim 1 comprising about 47% by weight aluminum nitride, about 24% by weight silica, about 24% by weight boron nitride and about 5% by weight alumina.

3. The multiphase ceramic composite of claim 1 wherein the boron nitride, aluminum nitride, silica and alumina are at least about 98% by weight pure.

4. The multiphase ceramic composite of claim 1 wherein the aluminum nitride, silica, boron nitride and alumina are 99.99% by weight pure.

5. The multiphase ceramic composite of claim 2 wherein the boron nitride particle size is about 0.5 micron to about 5 microns.

6. The multiphase ceramic composite of claim 1 wherein the reaction products of aluminum nitride, silica and alumina are $\beta'$-Sialon, 8 H aluminum nitride polytype and 15 R aluminum nitride polytype.

7. The multiphase ceramic composite of claim 6 wherein the $\beta'$-Sialon is $Si_2Al_4O_4N_4$.

8. A window transparent to electromagnetic radiation in the frequency spectrum of radar transmission, the window consisting essentially of a multiphase ceramic composite having a composition comprising: about 47% to about 52% by weight aluminum nitride, about 23% to about 27% by weight silica, about 3% to about 7% by weight alumina and the balance boron nitride, the boron nitride being one phase in the composite and the reaction products of aluminum nitride, silica and alumina being the matrix phase in the composite, wherein the boron nitride phase is uniformly distributed in the form of discrete particles throughout the reaction products of aluminum nitride, silica and alumina, the boron nitride particles having a maximum particle size of about 10 microns.

9. The window of claim 8 wherein the multiphase ceramic composition comprises about 47% by weight aluminum nitride, about 24% by weight silica, about 24% by weight boron nitride and about 5% by weight alumina.

10. The window of claim 8 wherein the boron nitride, aluminum nitride, silica and alumina of the multiphase ceramic composite are at least about 98% by weight pure.

11. The window of claim 8 wherein the aluminum nitride, silica, boron nitride and alumina of the multiphase ceramic composite are 99.99% by weight pure.

12. The window of claim 8 wherein the boron nitride particle size of the multiphase ceramic composite is about 0.5 micron to about 5 microns.

13. The window of claim 8 wherein the reaction products of aluminum nitride, silica and alumina which form the matrix phases in the multiphase composite, are $\beta'$-Sialon, 8 H aluminum nitride polytype and 15 R aluminum nitride polytype.

14. The window of claim 13 wherein the $\beta'$-Sialon is $Si_2Al_4O_4N_4$.

15. A method for fabrication of a window transparent to electromagnetic radiation comprising:

(a) grinding a mixture of about 47% to about 52% by weight aluminum nitride, about 23% to about 27% by weight silica and the balance boron nitride, the balance of boron nitride being dependent upon the amount of alumina provided in the mixture by alumina grinding media, in a ball mill containing an organic liquid and alumina grinding media for a sufficient amount of time to add about 3% to about 7% by weight alumina to the mixture from attrition of the alumina grinding media, to form a finely-divided, homogeneous mixture containing boron nitride having a maximum particle size of about 10 microns;

(b) drying the finely-divided homogeneous mixture;

(c) optionally passing the dried, finely-divided homogeneous mixture through a sieve to remove agglomerated particles; and (d) compacting the dried, finely-divided homogeneous mixture in an inert atmosphere at a temperature of at least about 1760° C. and a pressure of at least about 3775 p.s.i. in a boron nitride-lined graphite die for a sufficient time to form a compacted multiphase composite of silicon aluminum oxynitride reaction products from the aluminum nitride, silica and alumina, the boron nitride being uniformly distributed in the form of discrete particles throughout the reaction products, whereby the compacted multiphase composite is suitable as a window transparent to electromagnetic radiation.

16. The method of claim 15 for the fabrication of an antenna window.

* * * * *